United States Patent
Darcy et al.

(10) Patent No.: US 10,810,168 B2
(45) Date of Patent: Oct. 20, 2020

(54) ALLOCATING FILE SYSTEM METADATA TO STORAGE NODES OF DISTRIBUTED FILE SYSTEM

(71) Applicant: Red Hat, Inc., Raleigh, NC (US)

(72) Inventors: Jeffrey Jon Darcy, Lexington, MA (US); Shyamsundar Ranganathan, Billerica, MA (US)

(73) Assignee: Red Hat, Inc., Raleigh, NC (US)

( * ) Notice: Subject to any disclaimer, the term of this patent is extended or adjusted under 35 U.S.C. 154(b) by 1048 days.

(21) Appl. No.: 14/950,792

(22) Filed: Nov. 24, 2015

(65) Prior Publication Data

US 2017/0147602 A1 May 25, 2017

(51) Int. Cl.
*G06F 16/182* (2019.01)

(52) U.S. Cl.
CPC ................. *G06F 16/182* (2019.01)

(58) Field of Classification Search
CPC ......... G06F 17/30194; G06F 17/30224; G06F 16/178; G06F 16/18; G06F 16/182; G06F 16/1858; G06F 16/9537; G06F 16/1865
USPC .................................. 707/737, 741
See application file for complete search history.

(56) References Cited

U.S. PATENT DOCUMENTS

| | | | |
|---|---|---|---|
| 6,470,345 B1 * | 10/2002 | Doutre | G06F 16/10 |
| 8,214,404 B2 | 7/2012 | Kazar | |
| 8,392,370 B1 | 3/2013 | Whitney et al. | |
| 8,972,345 B1 | 3/2015 | Aguilera | |
| 2003/0126122 A1 * | 7/2003 | Bosley | G06F 16/1834 |
| 2004/0024778 A1 * | 2/2004 | Cheo | G06F 16/31 |
| 2005/0066095 A1 * | 3/2005 | Mullick | G06F 16/1774 |
| | | | 710/200 |
| 2007/0220023 A1 * | 9/2007 | Dean | G06F 16/951 |
| 2010/0262617 A1 * | 10/2010 | Shinjo | G06F 16/2246 |
| | | | 707/769 |
| 2011/0055494 A1 | 3/2011 | Roberts et al. | |
| 2011/0066668 A1 * | 3/2011 | Guarraci | G06F 16/27 |
| | | | 707/831 |

(Continued)

FOREIGN PATENT DOCUMENTS

| | | |
|---|---|---|
| CN | 102158546 A | 8/2011 |
| CN | 101697168 B | 10/2011 |
| CN | 103678715 A | 3/2014 |

OTHER PUBLICATIONS

Granger, Gregory R. et al. "Soft Updates: A Solution to the Metadata Update Problem in File Systems", ACM Transactions on Computer Systems, vol. 18. No. 2, May 2000, pp. 127-153.

(Continued)

*Primary Examiner* — James Trujillo
*Assistant Examiner* — Fariborz Khoshnoodi
(74) *Attorney, Agent, or Firm* — Lowenstein Sandler LLP

(57) ABSTRACT

Systems and methods for allocating file system metadata to storage nodes of a distributed file system. An example method may include: defining, by a processing device, a plurality of tokens, wherein each token comprises a sequence of bits; associating each token of the plurality of tokens with a metadata node of a cluster of metadata nodes; receiving a request to create a directory; selecting, among the plurality of tokens, a token associated with the directory; generating a directory identifier comprising the selected token; and creating, on a metadata node associated with the selected token, a directory record comprising the directory identifier.

14 Claims, 5 Drawing Sheets

(56) References Cited

U.S. PATENT DOCUMENTS

| | | | |
|---|---|---|---|
| 2011/0153606 A1 | 6/2011 | Kim et al. | |
| 2012/0166499 A1* | 6/2012 | Anderson | G06F 16/1774 |
| | | | 707/823 |
| 2012/0303631 A1* | 11/2012 | Bird | G06F 16/2255 |
| | | | 707/741 |
| 2013/0246422 A1* | 9/2013 | Bhargava | G06F 16/35 |
| | | | 707/737 |
| 2013/0339406 A1 | 12/2013 | Kanfi | |
| 2014/0150086 A1* | 5/2014 | Horst | H04L 63/0471 |
| | | | 726/18 |
| 2014/0188953 A1 | 7/2014 | Lin et al. | |

OTHER PUBLICATIONS

Parthasarathi, Krishnan et al. "DHT2: Refining/Redefining Gluster", gluster-devel@gluster.org, 40 Pages.

Weil, Sage A. et al. "Dynamic Metadata Management for Petabyte-scale File Systems", University of California, Santa Cruz, 2004, 12 Pages.

* cited by examiner

ALLOCATING FILE SYSTEM METADATA TO STORAGE NODES OF DISTRIBUTED FILE SYSTEM

TECHNICAL FIELD

The present disclosure is generally related to computer systems, and is more specifically related to allocating file system metadata to storage nodes of a distributed file system.

BACKGROUND

In a distributed computer system, data objects (such as files) may be stored on a plurality of interconnected nodes in accordance with a storage architecture defining the data object placement and replication policies. The system efficiency and reliability may be significantly affected by the principles and design choices governing the storage architecture.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for allocating file system metadata to storage nodes of a distributed file system. In certain implementations, a distributed file system may be provided by a network attached storage (NAS) system comprising one or more storage nodes each having one or more persistent data storage devices, such as magnetic or optical storage disks, solid-state drives (SSDs), etc. "Storage node" herein shall be broadly interpreted as referring to any storage system that is available for storing the files of a distributed file system.

In common implementations, the object placement policy implemented by a distributed file system may call for co-locating file data and file metadata (such as file size, file access permissions, creation/accesss/modification time, and direct and/or indirect pointer(s) to disk blocks storing the file data) on a single storage node. However, such a policy may adversely affect the overall system scalability as the number of files (and hence the volume of the file data and metadata) grows.

The present disclosure addresses the above noted and other deficiencies by storing the file metadata (such as file size, file access permissions, creation/accesss/modification time, and direct and/or indirect pointer(s) to disk blocks storing the file data) may separately from the file data. The file metadata may be distributed among a plurality of metadata nodes that collectively constitute a metadata cluster.

Thus, the advantages of systems and methods operating in accordance with one or more aspects of the present disclosure over common implementations include improving the distributed file system scalability. Various aspects of the above referenced methods and systems are described in details herein below by way of examples, rather than by way of limitation.

Figure 1:
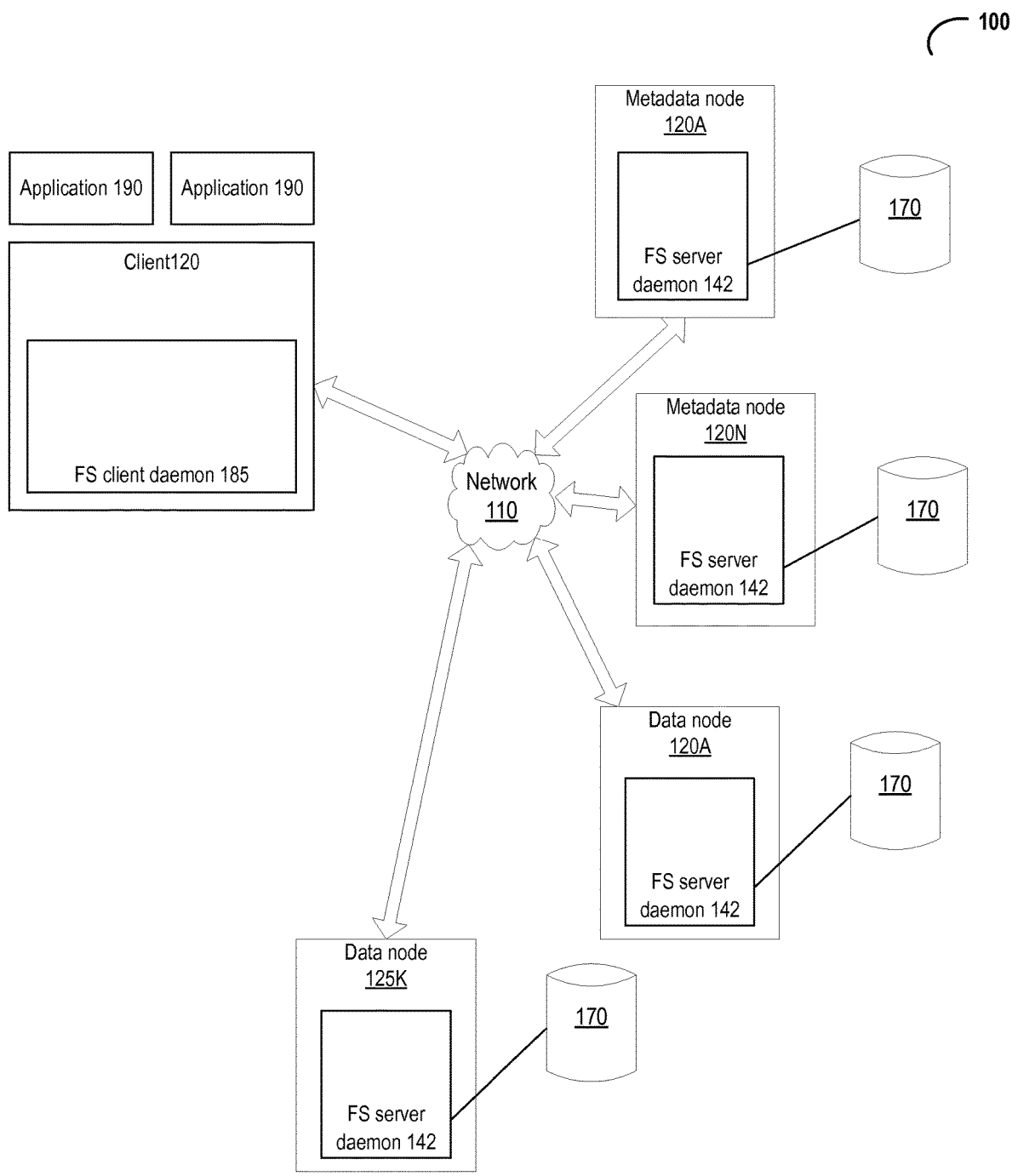
FIG. 1 schematically depicts a high-level component diagram of an example distributed file system operating in accordance with one or more aspects of the present disclosure.

FIG. 1 schematically depicts a high-level component diagram of an example distributed file system 100 operating in accordance with one or more aspects of the present disclosure. In certain implementations, distributed file system 100 may support data replication, load balancing, and other functions related to providing file system services.

Objects of a distributed file system may be referenced by identifiers of their index nodes. "Index node" or "inode" herein shall refer to a data structure associated with a file system object (e.g., a file or a directory). An index node representing a file system object may comprise one or more identifiers of physical locations (e.g., disk blocks) that store the contents of the file system object. An index node may further comprise various attributes of the file system object, including manipulation metadata (e.g., file creation, access, and/or modification time), as well as owner and permission metadata (e.g., group identifier, user identifier, and/or permissions). An index node may be identified by its number.

In certain implementations, file system metadata comprising directory entries (e.g., file name to directory mappings) may, in order to improve the distributed file system scalability, be stored by the distributed file system separately from the file index node and file data. On the other hand, file index nodes should have immutable locations in order to provide the file system consistency and at the same time permit certain file operations (such as file rename and/or hard links). "Hard link" herein refers to a directory entry that associates a name with a file. Certain file systems allow multiple hard links to be created for the same file, thus allowing multiple aliases for the file name, so that when the file is opened by referencing any of the hard links associated with the file, the changes that are made to the file contents will be visible when the file is opened by referencing any other hard links associated with the file.

As schematically illustrated by FIG. 1, the file system metadata comprising directory entries may be distributed among a plurality of metadata nodes 120A-120N that collectively constitute a metadata cluster. In the illustrative example of FIG. 1, each metadata node 120 may be represented by a storage server having one or more data storage devices 170. "Data storage device" herein shall refer to a memory device, such as a disk, RAID array, EEPROM device, or any other device capable of storing data. While in FIG. 1 each metadata node 120 is represented by a storage server, in alternative implementations, a metadata node may be provided by any storage system. In certain implementations, one or more metadata nodes may be collocated within a single storage server.

In certain implementations, a directory entry for a newly created file may be placed onto the same metadata node on which the parent directory for the file resides, thus keeping all leaf entries for the parent directory of the newly created file on a single metadata node. Conversely, a directory entry for a sub-directory would be created on a different metadata node, as placing all directories on a single metadata node would create a performance bottleneck and thus would adversely affect the system scalability. Metadata nodes for placing directory entries may be selected using the methods described herein below.

As noted herein above, index nodes and file data may be stored separately from the file system metadata comprising directory entries (e.g., file name to directory mappings). In the illustrative example of FIG. 1, index nodes and file data are distributed among a plurality of data nodes 125A-125K that collectively constitute a data cluster. In the illustrative example of FIG. 1, each data node 120 may be represented by a storage server having one or more data storage devices 170. Data nodes for placing file index node and file data may be selected using pluggable policies that are independent from the method of selecting metadata nodes for placing the file system metadata comprising directory entries.

Metadata nodes 120A-120N and data nodes 125A-125K may be accessed by one or more client computers 140 over a network 110, which may be provided by one or more local area networks, one or more wide area networks, or any combination thereof. Client computer 140 may be provided by a computer system including a processor, a memory, and at least one communication interface (the above noted components of client computer 140 are omitted from FIG. 1). Client computer 140 can execute one or more applications 190.

Each metadata node 120A-120N and data node 125A-125K may run a file system server daemon (or any other software component executable as one or more processes) 142 to export a local file system to clients 140. File system client daemon 185 running on client computers 140 may connect to metadata nodes 120A-120N and data nodes 125A-125K via an application-level protocol implemented over TCP/IP, InfiniBand or other transports, and access the files exported by the metadata nodes 120A-120N and data nodes 125A-125K.

Figure 2:
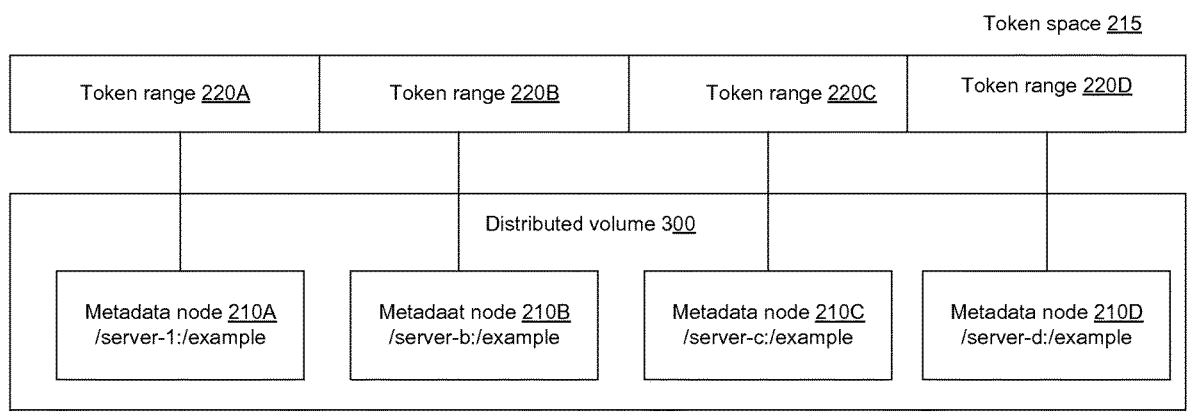
FIG. 2 schematically illustrates selecting metadata nodes for placing directory entries in accordance with one or more aspects of the present disclosure.

FIG. 2 schematically illustrates selecting metadata nodes for placing directory entries in accordance with one or more aspects of the present disclosure. A range of tokens {1 . . . T} may be defined, such that each token is represented by an integer value comprising a pre-determined number of bits. Each token may be assigned to a metadata node 120A-120N using a pre-defined policy, e.g., by assigning a range of token values to each metadata node, such that the combination of all ranges matches the token space with no gaps and no overlaps. In an illustrative examples, the token values may be evenly distributed across the metadata nodes, so that [T/M] or [T/M+1] tokens would be assigned to each metadata node, wherein T is the number of tokens and M is the number of metadata nodes. As schematically illustrated by FIG. 2, a metadata cluster 300 may comprise metadata nodes 210A-210D. Token space 215 may be evenly split among the metadata nodes into the corresponding ranges 220A-220D.

For a newly created directory, an associated token value may be selected using a pluggable policy. The index node for the newly created directory may be placed on the metadata node that is associated with the selected token value. In an illustrative example, the policy for selecting a token for associating with a newly created directory may call for randomly selected an unused token value (i.e., a token value that has not yet been assigned to another directory). In another illustrative example, the policy may produce an even distribution of directories across metadata nodes by starting with a random token value for the first directory being created and then, for subsequently created directories, cyclically allocating the metadata nodes in the round robin manner. In yet another illustrative example, the policy may dynamically assign weights to the tokens in order to produce an even distribution of directories across metadata nodes. In yet another illustrative example, the token value to be assigned to a newly created directory may be determined by hashing the directory name using a pre-determined hash function.

In order to relieve the distributed file systems servers and/or clients from storing the directory to metadata node allocations, the token number may be encoded into the directory index node number. In an illustrative example, the index node number may comprise 128 bits, and a 16-bit token value may be encoded into the most significant bits of the index node number, thus providing for $2^{112}$ unique index nodes per token.

As noted herein above, a directory entry for a newly created file may be placed onto the same metadata node on which the parent directory for the file resides, thus keeping all leaf entries for the parent directory of the newly created file on a single metadata node. Hence, the token associated with the parent directory for the newly created file may be encoded into the most significant bits of the index node number of the file.

In certain implementations, in order to decouple the file data from the file metadata, the file index node may be associated with an identifier of a file data index node. The file data index node may follow the same token encoding scheme as the file index node, or may conform to a different index node placement policy, and thus may be located on the same metadata node as the file index node, on a data node, or in an external data store.

Certain changes of the distributed file system configuration (e.g., addition of a metadata node) would cause a corresponding modification of token assignments to metadata nodes of the cluster, and would further cause physical migration of at least some directories to the newly added metadata node. In an illustrative example, if a metadata node has been added, the token ranges of all nodes would be modified to construct a new token range associated with the newly added metadata node, and hence the directories associated with the new token range would be migrated to the newly added metadata node.

As noted herein above, allocating file system metadata to storage nodes of a distributed file system in accordance with one or more aspects of the present disclosure increases the efficiency of performing certain file operations, since due to file index node being collocated with its directory entry, a single network request to a metadata node identified by the most significant bits of the file index node number is sufficient to retrieve all the necessary metadata associated with the file.

Figure 3:
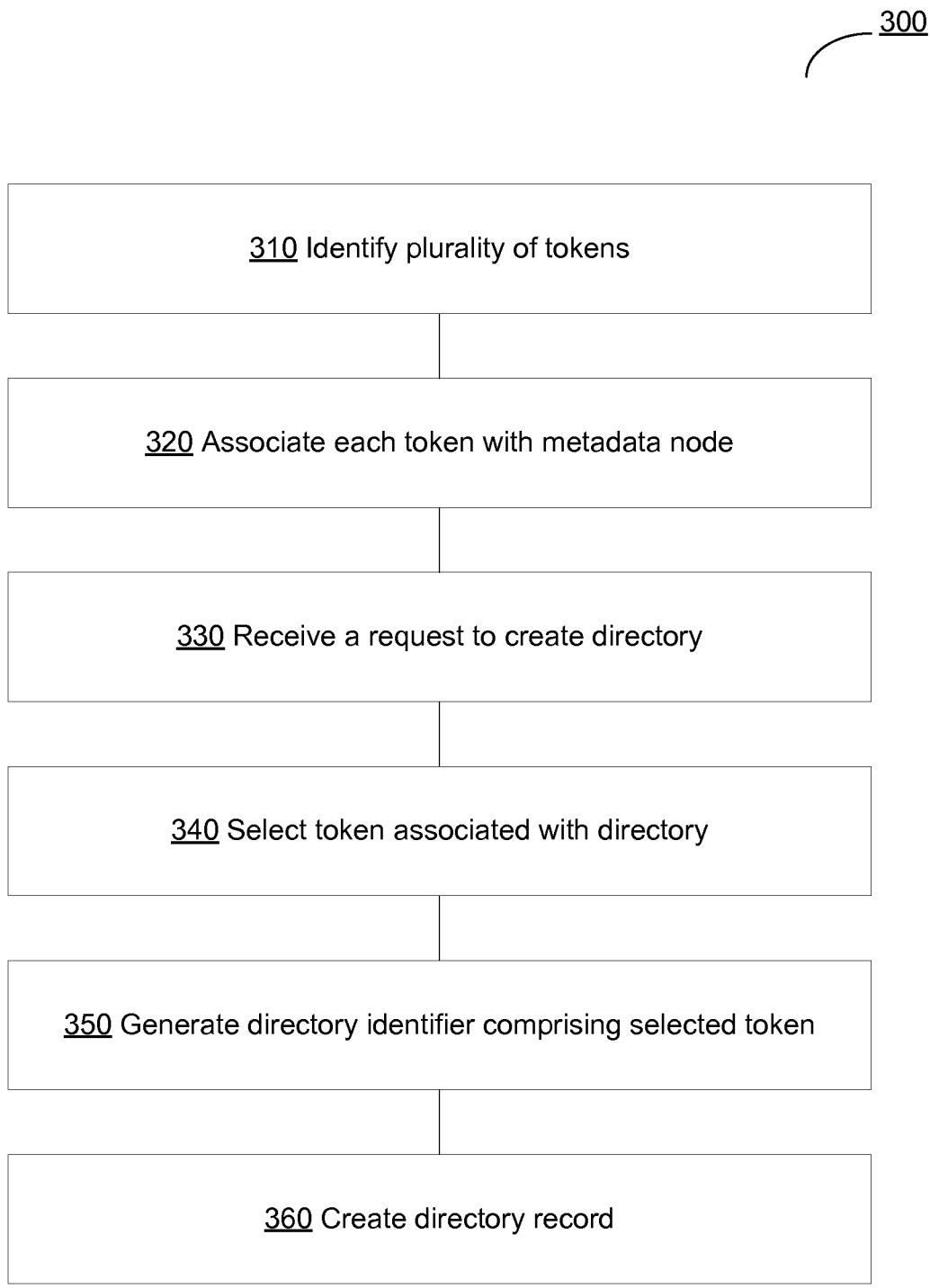
FIG. 3 depicts a flow diagram of an example method 300 performed by a processing device of a storage node of a distributed file system for creating a directory in accordance with one or more aspects of the present disclosure.

FIG. 3 depicts a flow diagram of an example method 300 performed by a processing device of a storage node of a distributed file system for creating a directory in accordance with one or more aspects of the present disclosure. Method 300 and/or each of its individual functions, routines, subroutines, or operations may be performed by one or more processors of the computer system (e.g., metadata node 120 of FIG. 1) executing the method. In certain implementations, method 300 may be performed by a single processing thread.

Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a processing device of a distributed file system node may define a plurality of tokens, such that each token is represented by a bit sequence. In an illustrative example, each token may be provided by a 16-bit integer value, as described in more details herein above.

At block 320, the processing device may associate each token of the plurality of tokens with a metadata node of a cluster of metadata nodes of the distributed file system. In an illustrative example, a range of tokens {1 . . . T} may be defined, such that each token is represented by an integer value comprising a pre-determined number of bits. Each token may be assigned to a metadata node using a pre-defined policy, e.g., by assigning a range of token values to each metadata node, such that the combination of all ranges matches the token space with no gaps and no overlaps, as described in more details herein above.

At block 330, the processing device may receive a request to create a directory in the distributed file system. The directory may be identified by a path (e.g., relative to a filesystem mounting point).

At block 340, the processing device may select, among the plurality of tokens, a token associated with the directory. The token selection may be performed using a pluggable policy. In an illustrative example, the policy for selecting a token for associating with a newly created directory may call for randomly selected an unused token value (i.e., a token value that has not yet been assigned to another directory). In another illustrative example, the policy may produce an even distribution of directories across metadata nodes by starting with a random token value for the first directory being created and then, for subsequently created directories, cyclically allocating the metadata nodes in the round robin manner. In yet another illustrative example, the policy may dynamically assign weights to the tokens in order to produce an even distribution of directories across metadata nodes. In yet another illustrative example, the token value to be assigned to a newly created directory may be determined by hashing the directory name using a pre-determined hash function, as described in more details herein above.

At block 350, the processing device may generate a directory identifier comprising the selected token. In certain implementations, the directory identifier may be provided by an index node number, and the token number may be encoded into the index node number. In an illustrative example, the index node number may comprise 128 bits, and a 16-bit token value may be encoded into the most significant bits of the index node number, as described in more details herein above.

At block 360, the processing device may create, on a metadata node associated with the selected token, a directory record comprising the directory identifier. The processing device may further create a parent directory entry associating the directory name and the directory identifier, and the method may terminate.

Figure 4:
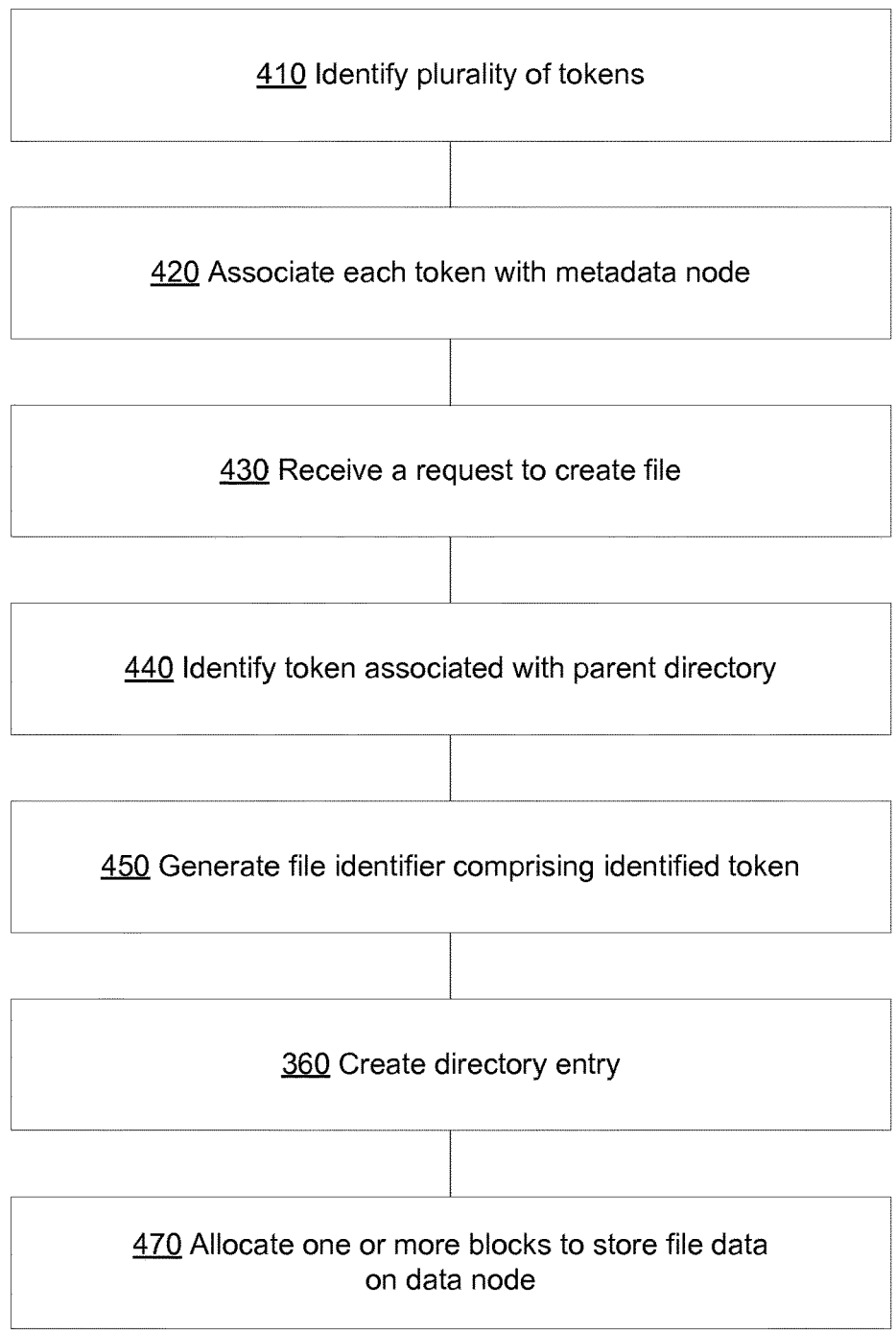
FIG. 4 depicts a flow diagram of an example method 400 performed by a processing device of a storage node of a distributed file system for creating a file in accordance with one or more aspects of the present disclosure.

FIG. 4 depicts a flow diagram of an example method 400 performed by a processing device of a storage node of a distributed file system for creating a file in accordance with one or more aspects of the present disclosure. Method 400 and/or each of its individual functions, routines, subroutines, or operations may be performed by one or more processors of the computer system (e.g., metadata node 120 of FIG. 1) executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a processing device of a distributed file system node may define a plurality of tokens, such that each token is represented by a bit sequence. In an illustrative example, each token may be provided by a 16-bit integer value, as described in more details herein above.

At block 420, the processing device may associate each token of the plurality of tokens with a metadata node of a cluster of metadata nodes of the distributed file system. In an illustrative example, a range of tokens {1 . . . T} may be defined, such that each token is represented by an integer value comprising a pre-determined number of bits. Each token may be assigned to a metadata node using a pre-defined policy, e.g., by assigning a range of token values to each metadata node, such that the combination of all ranges matches the token space with no gaps and no overlaps, as described in more details herein above.

At block 430, the processing device may receive a request to create a file in the distributed file system. The file may be identified by a path (e.g., relative to a filesystem mounting point).

At block 440, the processing device may identify a token associated with the parent directory. In certain implementations, the token number may be encoded into the most significant bits directory index node number, as explained in more details herein above.

At block 450, the processing device may generate a file identifier comprising the identified token. In certain implementations, the file identifier may be provided by an index node number, and the token number may be encoded into the index node number. In an illustrative example, the index node number may comprise 128 bits, and a 16-bit token value may be encoded into the most significant bits of the index node number, as described in more details herein above.

At block 460, the processing device may create, on a metadata node associated with the identified token, a directory entry comprising the file identifier. The directory entry may be represented by a record associating the file with the parent directory and mapping the file name to the file index node.

At block 470, the processing device may allocate, on a data node of a cluster of data nodes, one or more blocks to store file data associated with the file, and the method may terminate.

Figure 5:
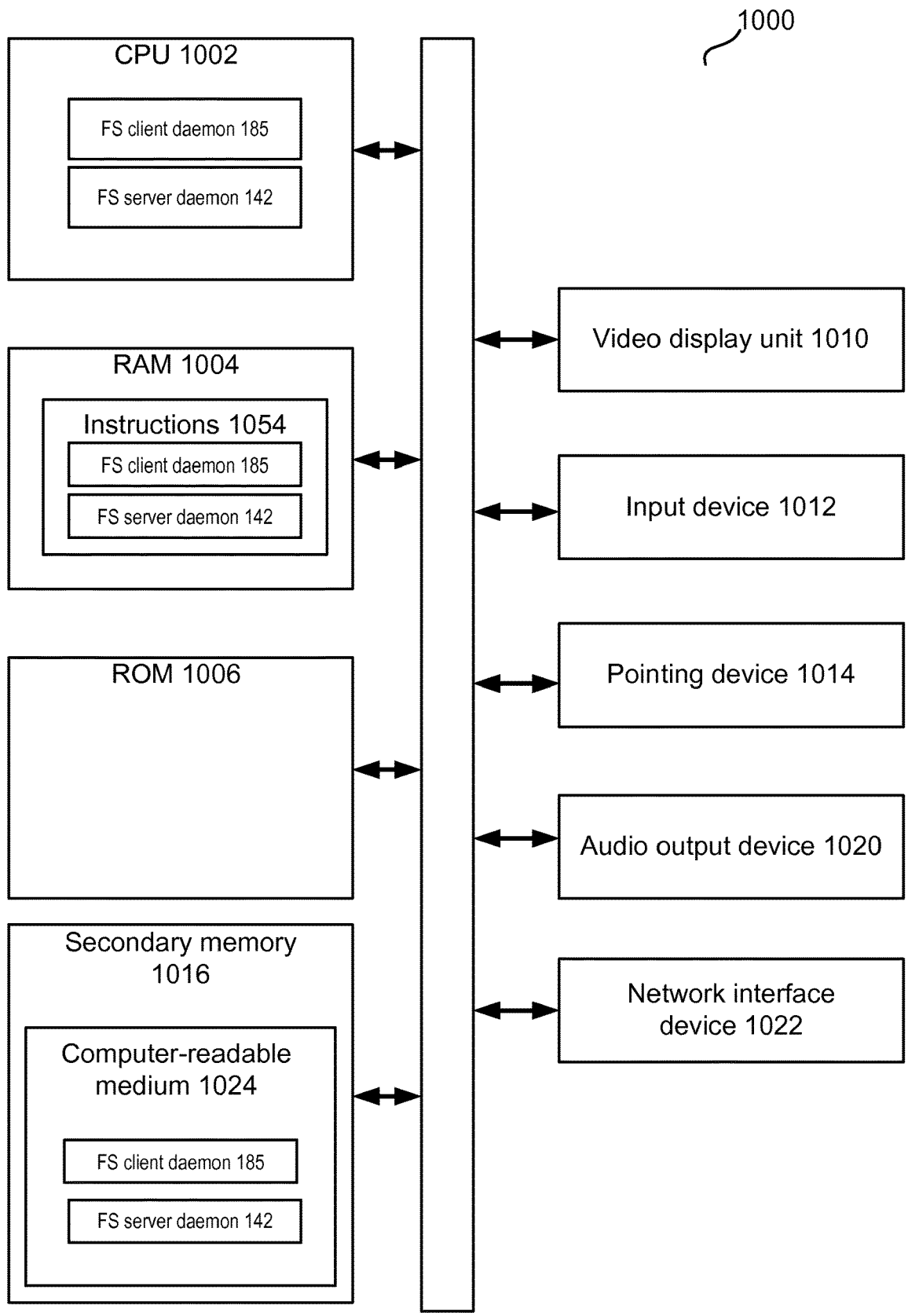
FIG. 5 depicts an illustrative computer system operating in accordance with one or more aspects of the present disclosure.

FIG. 5 depicts an illustrative computer system operating in accordance with examples of the present disclosure. In illustrative examples, computer system 1000 may correspond to metadata node 120, data node 125, or file system client 140 of FIG. 1.

In one example, computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

Processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alpha-numeric input device 1012 (e.g., a keyboard), a pointing device 1014 (e.g., a mouse), and an audio output device 1020 (e.g., a speaker).

In an illustrative example, secondary memory 1016 may include a tangible computer-readable storage medium 1024 on which may be stored instructions 1054 encoding file system server daemon 142 implementing method 300 for creating a directory and/or method 400 for creating a file in accordance with one or more aspects of the present disclosure. In another illustrative example, secondary memory 1016 may include a tangible computer-readable storage medium 1024 on which may be stored instructions 1054 encoding file system client daemon 185 for performing a file operation in accordance with one or more aspects of the present disclosure. Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 400 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
   defining, by a processing device, a plurality of tokens, wherein each token comprises a sequence of bits;
   associating each token of the plurality of tokens with a metadata node of a cluster of metadata nodes;
   receiving a request to create a directory;
   selecting, among the plurality of tokens, a token associated with the directory;
   generating an index node identifying the directory;
   storing the selected token into pre-defined most significant bit positions of an identifier of the index node; and
   creating, on a metadata node associated with the selected token, a directory record identified by the index node.

2. The method of claim 1, wherein selecting the token associated with the directory further comprises:
   randomly selecting an unused token among the plurality of tokens.

3. The method of claim 1, wherein selecting the token associated with the directory further comprises:
   hashing a name of the directory.

4. The method of claim 1, wherein associating each token of the plurality of tokens with a metadata node of a cluster of metadata nodes further comprises:
assigning a range of token values to each metadata node of the cluster of metadata nodes, wherein the combination of all ranges matches a range of token values with no gaps and no overlaps.

5. The method of claim 1, further comprising:
receiving a request to create a file associated with the directory;
identifying a token associated with the directory;
generating a file identifier comprising the selected token; and
creating, on a metadata node associated with the selected token, a directory entry comprising the file identifier.

6. The method of claim 5, wherein the file identifier is provided by an index node number.

7. The method of claim 1, further comprising:
allocating, on a data node of a cluster of data nodes, a block to store file data associated with the file.

8. A method, comprising:
defining, by a processing device, a plurality of tokens, wherein each token comprises a sequence of bits;
associating each token of the plurality of tokens with a metadata node of a cluster of metadata nodes;
receiving a request to create a file associated with a parent directory;
identifying a token associated with the parent directory;
generating an index node identifying the file;
storing the identified token into pre-defined most significant bit positions of an identifier of the index node; and
creating, on a metadata node associated with the identified token, a directory entry identified by the index node.

9. The method of claim 8, further comprising:
allocating, on a data node of a cluster of data nodes, a block to store file data associated with the file.

10. The method of claim 8, wherein associating each token of the plurality of tokens with a metadata node of a cluster of metadata nodes further comprises:
assigning a range of token values to each metadata node of the cluster of metadata nodes, wherein the combination of all ranges matches a range of token values with no gaps and no overlaps.

11. A non-transitory computer-readable storage medium comprising executable instructions that, when executed by a processing device, cause the processing device to:
define, by the processing device, a plurality of tokens, wherein each token comprises a sequence of bits;
associate each token of the plurality of tokens with a metadata node of a cluster of metadata nodes;
generate an index node identifying a directory;
store a selected token into pre-defined most significant bit positions of an identifier of the index node; and
create, on a metadata node associated with the selected token, a directory record identified by the index node.

12. The non-transitory computer-readable storage medium of claim 11, wherein executable instructions to associate each token of the plurality of tokens with a metadata node of a cluster of metadata nodes further comprise executable instructions causing the processing device to:
assign a range of token values to each metadata node of the cluster of metadata nodes, wherein the combination of all ranges matches a range of token values with no gaps and no overlaps.

13. The non-transitory computer-readable storage medium of claim 11, further comprising executable instructions causing the processing device to:
receive a request to create a file associated with a directory identified by the directory identifier;
identify a token associated with the directory;
generate a file identifier comprising the selected token; and
create, on a metadata node associated with the selected token, a directory entry comprising the file identifier.

14. The non-transitory computer-readable storage medium of claim 13, further comprising executable instructions causing the processing device to:
allocating, on a data node of a cluster of data nodes, a block to store file data associated with the file.

* * * * *